2 Sheets—Sheet 1.

J. F. KELLER.

FERTILIZER DISTRIBUTER.

No. 10,640. Reissued Aug. 25, 1885.

Witnesses:
W. D. Herring
Bessie Ashley

John F. Keller
Inventor
By J. H. Ashley
Attorney.

J. F. KELLER.
2 Sheets—Sheet 2.
FERTILIZER DISTRIBUTER.
No. 10,640.
Reissued Aug. 25, 1885.
Fig. 3.
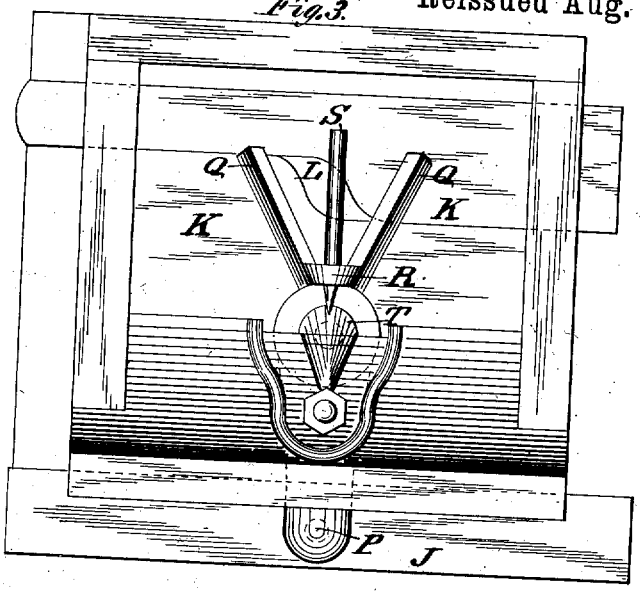
Fig. 4.
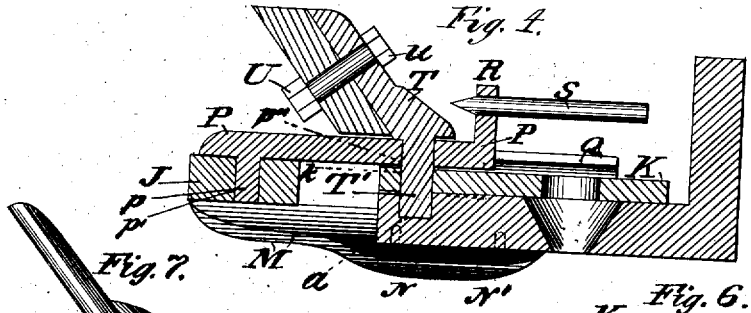
Fig. 7.
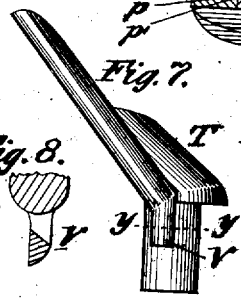
Fig. 8.
Fig. 6.
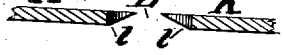
Fig. 5.
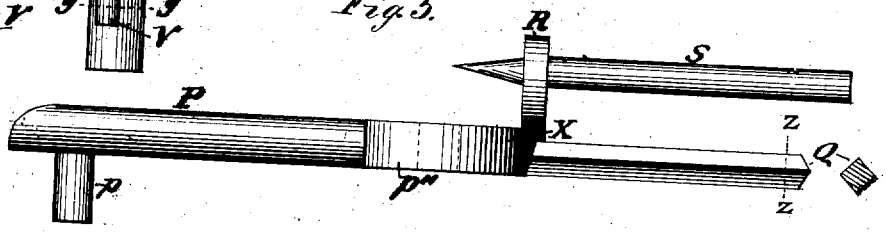
Witness:
W. D. Harrington
Bessie Ashley
John F. Keller
Inventor.
by J. A. Ashley
Attorney.

UNITED STATES PATENT OFFICE.

JOHN F. KELLER, OF SHEPHERDSTOWN, WEST VIRGINIA.

FERTILIZER-DISTRIBUTER.

SPECIFICATION forming part of Reissued Letters Patent No. 10,640, dated August 25, 1885.

Original No. 265,674, dated October 10, 1882. Application for reissue filed October 6, 1884.

*To all whom it may concern:*

Be it known that I, JOHN F. KELLER, a citizen of the United States, residing at Shepherdstown, in the county of Jefferson and State of West Virginia, have invented certain new and useful Improvements in Apparatus for Distributing Guano and other Fertilizing Substances, of which the following is a description.

The invention relates, particularly, to the hopper to which the fertilizing material is supplied, and from which in a regulated current it is discharged; and the invention consists in certain novel elements and combinations of elements, in the construction of the mechanism by which the substance is agitated, and by which its discharge is controlled and regulated.

Figure 1:
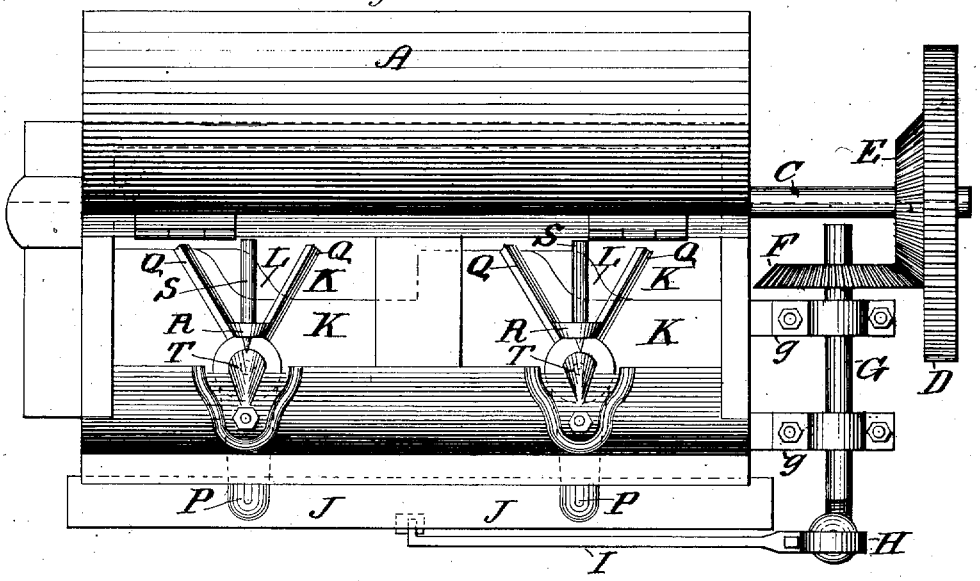
Figure 2:
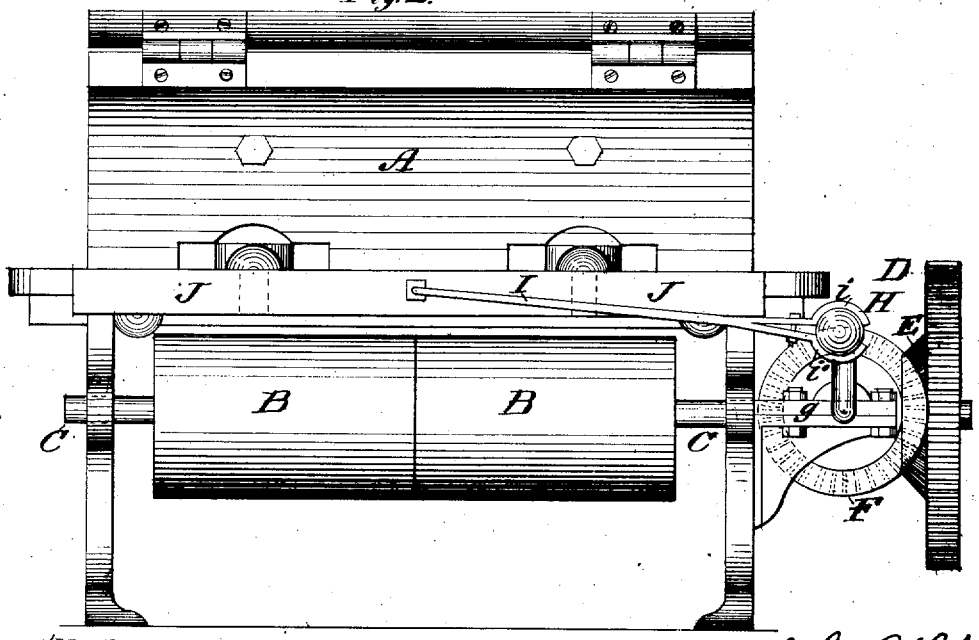

In the drawings, Figure 1 represents a plan view of the hopper and mechanism connected therewith, the lid of the hopper being removed or thrown open. Fig. 2 is a rear view of the hopper and its exterior mechanism, the parts being shown in elevation. Fig. 3 is a top plan view showing the interior bottom portion of the hopper. Fig. 4 is a vertical transverse section on the line *x x* of Fig. 3. Fig. 5 is a view in elevation of one of the stirrer-bars and the parts which are borne thereon. Fig. 6 is a detail vertical section showing one of the discharge-openings. Fig. 7 is a side elevation of one of the securing-plates detached. Fig. 8 is a detail showing a portion of one of the securing-plates in horizontal section, as on line *y y* of Fig. 7.

A designates the hopper, which is supported upon the frame of the vehicle in any approved manner. B are the feed-rollers, borne on the axle C, which receives motion from gear-wheel D, which is operated by a gear-wheel upon one of the driving-wheels of the machine. A bevel gear-wheel, E, fixed upon the axle C, engages with a bevel-wheel, F, which is fixed upon a shaft, G, which is supported in bearings *g g*, which project from the frame of the machine. The shaft G has a crank-arm, H, which is engaged by jaws *i i'* of a connecting-rod, I, which in operation imparts a reciprocating motion to the coupling-bar J, which is loosely supported upon brackets or keepers M M, which are adjustably secured to the bottom A' of the hopper by screws N N', as seen in Fig. 4. In the bottom of the hopper are the discharge plates or slides K, which have S-shaped curves upon their edges to produce between them S-shaped discharge-openings L, as best seen in Figs. 1 and 3. These slides are at this point beveled or undercut, as shown in Fig. 6, to make more certain the discharge of the fertilizing material, the sharp edges *l* serving, in connection with the fingers Q, which fit closely upon the slides, to cut away and insure the discharge of any portions of the same which may have collected upon any of the contiguous parts. The coupling-bar J has openings *p'*, for the reception of pivot-pins *p* on the lower face of the outer end of the stirrer-bars P. The stirrer-bars P, extending from the coupling-bar inwardly through the wall of the hopper, are provided upon their inner extremity, X, with an upwardly-projecting arm, R, to receive a middle upper finger, S, which is preferably circular in cross-section, as shown.

Extending obliquely outward from the end X of the stirrer-bar are two angular fingers, Q Q, which in transverse section are of the diamond form shown in Fig. 5.

Preferably the body of the stirrer-bar is of cast-iron, while the fingers Q will ordinarily be of steel, the two being connected in the process of casting the stirrer-bars. These fingers fit closely upon the top of the plates K, and the construction, while insuring great strength, serves to prevent the fertilizing material from collecting on the surface of the slides, the sharp lower edges, as they are moved to and fro, operating to scrape off any adhering portions thereof.

The stirrer-bars P are provided with a vertical perforation, *p''*, and the slide upon the rear side of the hopper has a corresponding perforation, *k*, while the bottom of the hopper has in its upper surface a cavity, *a*, which forms a continuation of these perforations. An inclined securing-plate, T, is fitted upon the flat upper surface of the stirrer-bars in the bottom of the hopper and upon the inclined interior wall of the hopper, being made fast thereto by bolt U and nut *u*, as seen in Fig. 4, and a holding-spindle or pivot-pin, T', which projects downwardly from the flat lower surface of the securing-plate T, is adapted to fit the perforations $p''$ and $k$ and the cavity $a$, above described. The flat horizontal portion of the securing-plate, extending, as shown, from the pivot-pin or holding-spindle toward the front and toward the rear of the hopper and lengthwise along the stirrer-bars, serves to hold the same in close contact with the feed-slides, and this broad bearing insures perfect steadiness and smoothness of movement of the bars as they pass to and fro along the surface of the slides.

In order to prevent the material from clogging the joint between the stirrer-bar and the edge of the hopper near the securing-plate, a projection, V, of the form shown in Figs. 7 and 8, is provided upon the side of the plate. This projection operates as the bars are moved to cut away or break off any of the material which may have accumulated upon the parts. The spindle or pin T′ engages, as will be seen, with the hopper, the slide, and the stirrer-bar, preventing lateral displacement, while at the same time it serves as a fulcrum for the stirrer-bar. By this construction the frictional surface upon the pivot-pin is limited to the walls of the perforation $p''$ in the stirrer-bar.

The screws N and N′ effect the twofold purpose of securing the brackets or supports M M to the body of the hopper and of adjusting the fingers Q in their relation to the top of the slides. If through abrasion or otherwise the space between the bottom of the stirrer-bars and their lower fingers and the top of the slides becomes too great, the screw N′ may be loosened, thus bringing the parts more closely in contact, and thereby preventing any accumulation of the fertilizing substance between them.

It will be observed that the reciprocating motion of the coupling-bar produces oscillating motion of each end of the stirrer-bars in an arc concentric with the fixed fulcrum T′, the resultant friction of the vertical surfaces being limited to the pin $p$ and its opening $p'$ and the orifice $p''$ and the corresponding portion of the fixed holding-spindle or pivot-pin T′.

Having described my invention, I claim—

1. The combination, with the hopper of a fertilizer-distributer, of the securing-plates T, each having horizontal and inclined face, as described, and a lateral projection, V, whereby accumulations are removed from the stirrer-bars, as set forth.

2. The combination, with the hopper of a fertilizer-distributer, of the securing-plates T, each having a horizontal and an inclined surface, one or more lateral projections, V, for the removal of accumulations from the stirrer-bars, and a holding-spindle, T′, which serves as a fixed bearing for the stirrer-bars.

3. The combination, with the hopper of a fertilizer-distributer, of the securing-plates T, each having a horizontal and an inclined face, and a fixed holding-spindle, and a stirrer-bar which has oscillation upon such fixed spindle.

4. The combination of the holding-spindle T′ upon the securing-plate T, the stirrer-bar P, having agitating-fingers, the rear slide, K, and the hopper A, having cavity $a$, whereby the stirrer-bar and the rear slide are maintained in adjustment with the hopper, and a fixed pivotal bearing is provided for the stirrer-bars, as set forth.

5. The combination, with the hopper A, of a securing-plate, T, a fixed vertical holding spindle or bearing which projects from the bottom of such securing-plate, and a fingered stirrer-bar which has oscillation upon such fixed bearing.

6. The combination, with the hopper of a fertilizer-distributer, of the stirrer-bar P, provided with pivot-pin $p$, perforation $p''$, and perforated and fingered arm R.

7. The combination, with the hopper of a fertilizer-distributer, of supporting brackets or keepers, a coupling-bar which rests loosely upon such brackets, a fingered stirrer-bar which is pivotally connected with such coupling bar, and securing and adjusting screws which engage with the brackets and with the hopper, whereby the fingers of the stirrer-bar are made adjustable vertically in relation to the upper surface of the feed-slides, as described.

8. The combination, with the hopper of a fertilizer-distributer, of a securing-plate which has an inclined face to fit the inclined wall of the hopper, a horizontal face to fit the horizontal top surface of the stirrer-bar, and which has also a holding-spindle which projects downwardly from the bottom of such plate and serves as a fixed bearing for the stirrer-bar.

9. The combination, with the hopper of a fertilizer-distributer, of a securing-plate which has a flat portion to fit one of the inner walls of such hopper, a flat portion to fit the top of the stirrer-bars, and a downwardly-projecting spindle which engages with the stirrer-bars, which engages also with the rear feed-slide, and which engages also with the bottom of the hopper.

10. The combination, with the hopper of a fertilizer-distributer, of a securing-plate which is bolted to the rear wall of the hopper, which by its horizontal portion rests upon the stirrer-bars at a point within the hopper, and which is provided with a downwardly-extending spindle, a fingered stirrer-bar which has oscillation upon such spindle, a perforated slide which receives and is secured and guided by such spindle, and a bottom plate which, by a cavity in its upper surface, is engaged by such spindle.

11. In a fertilizer-distributer, a stirrer-bar provided with pin $p$, arm R, and fingers Q Q and S.

12. In a fertilizer-distributer, the slides K, forming the S-shaped opening and having the sharp edges *l*, in combination with the fingers Q, having sharp edges, and with mechanism, substantially as described, for operating the fingers.

13. The combination of the stirrer-bars P, provided with fingers Q, the securing-plates T, attached to the hopper, the supporting brackets or keepers M, and the coupling-bar J, arranged and adapted to operate together substantially as set forth.

JOHN F. KELLER.

Witnesses:
BESSIE ASHLEY,
O. M. BALL.